United States Patent
Bhimani et al.

(10) Patent No.: US 10,210,024 B2
(45) Date of Patent: Feb. 19, 2019

(54) INTELLIGENT CONTROLLER FOR CONTAINERIZED APPLICATIONS

(71) Applicant: Samsung Electronics Co., Ltd., Suwon-si, Gyeonggi-do (KR)

(72) Inventors: Janki Bhimani, Billerica, MA (US); Hingkwan Huen, Daly City, CA (US); Jingpei Yang, Santa Clara, CA (US); Manu Awasthi, San Jose, CA (US); Vijay Balakrishnan, Mountain View, CA (US); Jason Martineau, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 15/379,327

(22) Filed: Dec. 14, 2016

(65) Prior Publication Data

US 2018/0060125 A1 Mar. 1, 2018

Related U.S. Application Data

(60) Provisional application No. 62/378,596, filed on Aug. 23, 2016.

(51) Int. Cl.
*G06F 9/455* (2018.01)
*G06F 9/50* (2006.01)

(52) U.S. Cl.
CPC .......... *G06F 9/5083* (2013.01); *G06F 9/455* (2013.01)

(58) Field of Classification Search
None
See application file for complete search history.

(56) References Cited

U.S. PATENT DOCUMENTS

| | | |
|---|---|---|
| 7,581,224 B2 | 8/2009 | Romero |
| 8,621,069 B1 | 12/2013 | Tompkins |
| 8,776,068 B2* | 7/2014 | Ax .......................... G06F 9/445 705/1.1 |
| 9,210,040 B2 | 12/2015 | Mikkilineni |
| 9,210,141 B2 | 12/2015 | Anderson et al. |
| 9,225,772 B2 | 12/2015 | Lui et al. |
| 9,405,593 B2 | 8/2016 | McGrath et al. |
| 2006/0161753 A1 | 7/2006 | Aschoff et al. |
| 2006/0168107 A1* | 7/2006 | Balan ..................... G06F 9/505 709/218 |
| 2011/0252181 A1* | 10/2011 | Ouye ................. G06F 17/30519 711/101 |
| 2016/0162320 A1* | 6/2016 | Singh .................... G06F 9/5055 718/1 |
| 2016/0306550 A1* | 10/2016 | Liu ........................ H04W 12/08 |
| 2017/0052772 A1* | 2/2017 | Chen .................. G06F 9/45558 |
| 2017/0063722 A1* | 3/2017 | Cropper .................. H04L 47/82 |
| 2017/0085419 A1* | 3/2017 | Zhang ................. H04L 41/5051 |

(Continued)

FOREIGN PATENT DOCUMENTS

CN 107423112 A * 12/2017

*Primary Examiner* — Dong U Kim
(74) *Attorney, Agent, or Firm* — Lewis Roca Rothgerber Christie LLP (57) ABSTRACT

A system includes a plurality of storage drives configured to store data associated with at least one of homogeneous and heterogeneous applications running in containers; and a controller configured to balance workloads of the containers by grouping the containers based on characteristics of the workloads of the containers.

19 Claims, 4 Drawing Sheets

(56) References Cited

U.S. PATENT DOCUMENTS

2017/0201490 A1* 7/2017 Kinder ................ H04L 63/0272
2017/0220267 A1* 8/2017 Neelakanta ........... G06F 3/0614
2018/0006886 A1* 1/2018 Dhanakshirur ..... H04L 41/0816
2018/0046487 A1* 2/2018 Matters ............. G06F 17/30174

* cited by examiner

INTELLIGENT CONTROLLER FOR CONTAINERIZED APPLICATIONS

CROSS-REFERENCE TO RELATED APPLICATION

This utility patent application claims priority to and the benefit of U.S. Provisional Patent Application Ser. No. 62/378,596, filed Aug. 23, 2016, entitled "MULTI-CONTAINER WORKLOAD BALANCING FOR OPTIMAL DISK USAGE" the entire content of which is incorporated by reference herein.

BACKGROUND

Docker containers are gaining more user-space utilization due to their simple and efficient operation characteristics. Container technology is projected to be the backbone on which software development cycle can be shortened. Containers and virtual machines have similar resource isolation and allocation benefits but a different architectural approach allows containers to be generally more portable and efficient compared to bare metal and virtual machines. Containers are also proposed as a solution to alleviate dependency issues. The lightweight characteristics of docker containers typically promote the simultaneous use of multiple containers to deploy multiple instances of same or different applications. With the increase in number of containers, the performance can get better initially but due to limitation of hardware resources, performance may eventually saturate or may even degrade. But in order to cope-up with the increasing necessity of multitenancy of applications, having multiple containers is desirable. Thus, to keep up with such necessities, understanding the performance of different types of I/O intensive containerized application is important.

In order to exploit such a parallel containerized platform, which would be data intensive, a fast back-end storage support is highly desirable. High-end solid state drives ("SSDs") typically provide much faster access to data compared to conventional hard disk drives. Recently, flash-based SSDs have become standard options for laptop and desktop storage and the trade-off studies of operating enterprise server storage with SSDs have also resulted in its favor. Furthermore, with the world looking forward towards high performance SSDs for their massive storage needs, Non Volatile Memory Express ("NVMe") is emerging as the protocol for communication with high performance SSDs over Peripheral Component Interconnect Express ("PCIe"). However, when a system includes different types of workloads and applications for these NVMe high end SSDs, there may be performance degradation.

The above information disclosed in this Background section is only to enhance the understanding of the background of the disclosure, and therefore it may contain information that does not constitute prior art.

SUMMARY

According to example embodiments of the present invention, a storage utilization of containerized applications is improved or optimized. A controller (e.g., an intelligent controller) may be used to group similar applications for improved or optimum performance in a containerized environment. The controller understands the nature of the workloads, and assigns (or distributes) the workloads in the containers to different storage devices.

According to example embodiments of the present invention, the performance of a system that includes different types of workloads and applications for these NVMe high end SSDs is improved or optimized.

According to example embodiments of the present invention, a controller (e.g., an intelligent controller) is utilized (or implemented) to improve or optimize the performance of database applications that use docker containers on an array of multiple NVMe SSDs.

According to example embodiments of the present invention, smart containerization of heterogeneous applications and workloads for a non-virtual machine (VM), containerized platform (e.g., lightweight containerized environment) such as docker or Linux Container (LxC), is provided. For example, a controller (e.g., an intelligent controller) according to example embodiments may aim to achieve better application level fairness (e.g., application throughput fairness and/or appropriate application scheduling), Quality of Service ("QoS") and resource utilization for lightweight containers operating directly on a host machine without hypervisor and virtual machine.

According to some example embodiments of the present invention, a system includes: a plurality of storage devices configured to store data associated with at least one of homogeneous and heterogeneous applications running in containers; and a controller configured to balance workloads of the containers by grouping the containers based on characteristics of the workloads of the containers.

The system may further include a detector configured to detect characteristics of a new workload to be assigned to the containers.

The detector may obtain characteristics of and existing workload running in the containers.

The detector may assign the new workload to the containers based on the characteristics of the new workload and the existing workload.

The detector and the controller may be integrally implemented.

The controller may obtain information regarding the assignment of the new workload from the detector.

The controller may balance the workloads by distributing the containers to one or more of the storage devices.

The controller may balance the workloads to improve quality of service (QoS) in terms of application throughput and latency.

The controller may balance the workloads to improve distribution of the containers, thereby improving utilization of the storage devices.

The controller may balance storage resource requirements for all containerized applications to ensure fair resource management.

The controller may balance the workloads by grouping all sequential accesses to one of the storage devices or a group of the storage devices.

The controller may balance the workloads by grouping write-intensive and read-intensive containers to one of the storage devices or a group of the storage devices.

The controller may balance the workloads by grouping active and idle containers to one of the storage devices.

The controller may balance the workloads by grouping the containers of similar TTL (time to live) to a same one of the storage devices.

According to some example embodiments of the present invention, a method of balancing workloads in containers is provided. The method includes: receiving a new workload; receiving or detecting characteristics of the new workload; obtaining characteristics of existing workloads in the containers; and assigning the new workload to the containers based on the characteristics of the new workload and the characteristics of the existing workloads.

The method may further include: reading a pre-processed grouping algorithm; obtaining information on the workloads of the containers; and assigning the containers to different device or devices based on the information on the workloads of the containers.

The workloads may be balanced by grouping all sequential accesses to a storage device or a group of storage devices.

The workloads may be balanced by grouping write-intensive and read-intensive containers to a storage device or a group of storage devices.

The workloads may be balanced by grouping active and idle containers to a same storage device.

The workloads may be balanced by grouping the containers of similar TTL (time to live) to a same storage device.

According to some example embodiments of the present invention, a controller for workload balancing of containerized applications is configured to assign containers to different device or devices based on information on the workloads of the containers.

By combining one or more example embodiments and/or features described above and throughout the specification, smart containerization of heterogeneous applications and workloads may be realized.

BRIEF DESCRIPTION OF THE DRAWINGS

The above and other aspects and features of the present invention will become more apparent to those skilled in the art from the following detailed description of the example embodiments with reference to the accompanying drawings.

DETAILED DESCRIPTION

Docker provides application virtualization using a containerized environment. A docker image is an inert, immutable, file that is essentially a snapshot of a container. Multiple docker containers can be instantiated with an application image. In order to maintain lightweight characteristics, it is generally desirable to keep the installation stack within the container as small as possible for better performance. The data management of containers is superintended either by docker storage drivers (e.g. OverlayFS, AUFS, Btrfs, etc.) or by docker data volumes.

A docker daemon generally runs on one storage driver, and all containers created by that daemon instance typically use the same storage driver. Storage drivers operate with copy-on-write technique, which may be more advantageous or suitable for read intensive applications. For applications that generate heavy write workloads, it may be desirable to maintain data persistence. Docker volumes are a mechanism to automatically provide data persistence for containers. A volume is a directory or a file that can be mounted directly inside the container. The biggest benefit of this feature may be that I/O operations through this path may be independent of the choice of the storage driver, and may be able to operate at the I/O capabilities of the host.

In a containerized environment, there are a number of containers that are concurrently (or simultaneously) running and include different types of workloads that may be conflicting with each other (e.g., may have resource conflicts). Instead of assigning the containers to different devices without taking into account the nature of the containers, the controller (e.g., intelligent controller) according to example embodiments of the present invention understands the nature of these containers, and may assign non-conflicting containers to the same storage device (e.g., solid state drive (SSD)) so that a more real life, full utilization of resources is achieved rather than conflicting use of the resources. For example, some of the devices may have a high bandwidth and other devices may have a low bandwidth. Hence, the controller may understand or be configured to understand the workloads and the devices, and may understand which types of workloads work better together than with other types of workloads, and may mix the workloads in a way that will improve or optimize resource utilization.

The application layer setup can be segregated into homogeneous and heterogeneous categories. The container instances of the same database applications with the same workload characteristics may be referred to as "homogeneous" as all such containers behave similarly. For example, the setup may be called homogeneous if all containers are MySQL running TPC-C. Meanwhile, the container instances of either different database application or different workloads may be referred to as heterogeneous. For example, the setup may be called heterogeneous if some containers are of MySQL running TPC-C and simultaneously some other containers are of Cassandra running Cassandra-stress. The processing layer may include a shared processing unit for which all the docker containers compete. The storage layer may include one or more logical volumes of one or more flash drives. In some cases, an array of multiple SSDs may be treated as a stripped logical volume.

For homogeneous containers, if a single container application is performing a relatively large number of writes, then increasing the number of such homogeneous containers typically increases throughput until resources (e.g., CPU and disk) become saturated. If the application is more read intensive and the container size is small, such that majority of its operations can be performed from page cache and memory, then the number of containers can be limited before falling into a throughput valley.

A smart heterogeneous mix of containers of different applications may lead to better utilization of overall throughput. It may not be desirable to mix containers of applications performing sequential writes and random writes, because for such a mix the throughput distribution may be unfair. In such a mix, the throughput of application performing random writes may degrade by more than 50%. A combination of the containers of applications performing similar operations (e.g. all performing a majority of sequential writes or a majority of random writes), may lead to fair throughput throttles between application containers.

Further, combining containers of write intensive and read intensive applications may increase the resource utilization with fair throughput degradation. In spite of operating double the number of simultaneous containers, the united throughput of each application may degrade only around 10% when compared to the standalone implementation of respective applications.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
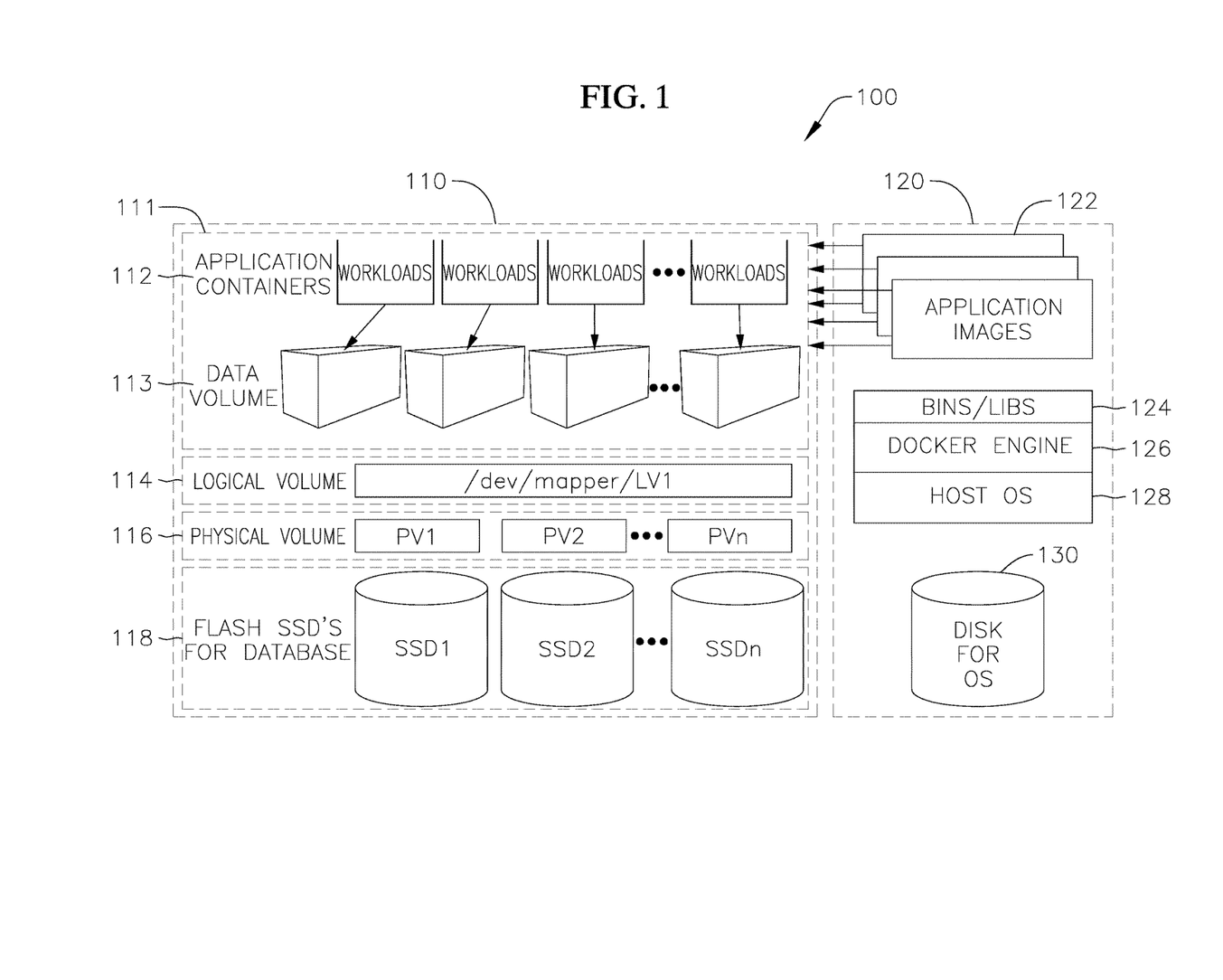
FIG. 1 is a schematic diagram illustrating a containerized system on a flash volume of SSDs, which may be applied to one or more example embodiments of the present invention.

FIG. 1 is a schematic diagram illustrating a containerized system 100 on a flash volume of solid state drives ("SSDs") (e.g., flash SSDs) 118, which may be applied to one or more example embodiments of the present invention. While only three SSDs (SSD1, SSD2, . . . SSDn) 118 are illustrated in FIG. 1, the present invention is not limited thereto, and the containerized system 100 may include any suitable number of SSDs as those skilled in the art would appreciate.

As illustrated in the containerized system 100 of FIG. 1, a first storage layer (or a first storage device or unit, or a first system) 110 includes the SSDs (SSD1, SSD2, . . . SSDn) 118 and a second storage layer (or a second storage device or unit, or s second system) 120 includes a disk 130, which may be a hard disk drive ("HDD") or a solid state drive ("SSD"). The first system 110 and the second system 120 of FIG. 1 may have the same hardware/software topology, but illustrate different views. For example, the first system 110 may also include a hard disk drive and/or any other suitable storage devices, and similarly, the disk 130 may be referred to as or include one or more of SSDs, HDDs and/or any other suitable storage devices.

As illustrated in FIG. 1, the disk 130 of the second system 120 is separated (or maintained as a separated disk) from the SSDs 118, and maintains application images 122, bins/libraries 124, a docker engine 126 and a host operating system (OS) 128 thereon. The hardware topology of the containerized system according to the present invention is not limited to that depicted in FIG. 1, but can have any suitable topology as those skilled in the art would appreciate.

The array of SSDs (e.g., 3 or more SSDs) 118 may be used to persist data of applications 111 that run in docker (e.g., run using the docker engine 126). The database applications have a containerized architecture in which each of the applications runs in a corresponding one of containers 112 that has associated workload or workloads. Each of the containers 112 also has an associated data volume 113, which represents an amount of associated data (e.g., application data) stored in the SSDs 118. The applications (e.g., database applications) run utilizing a memory (e.g., a system memory of the containerized system 100, which may a part of the first system 110 and/or the second system 120. In some example embodiments, the installation stack of container platform (e.g., the docker engine 126) is installed/implemented separately outside of the first system 110 in the second system 120.

A physical volume mapping (e.g., PV1, PV2, . . . PVn) of the SSDs 118 represents (or corresponds to) 100% capacity of each of the SSDs, and is created through a logical volume mapping ("LVM") 114. The multiple physical volumes 116 may be combined to form a single logical volume 114 as those skilled in the art would appreciate. Further, while the multiple physical volumes 116 in FIG. 1 depict one type of storage managers for multiple drives ("LVM"), other types of managers, for example, a device mapper, may be utilized according to one or more example embodiments. In some example embodiments, the data written to the LVM 114 may be laid out in a stripped fashion across some or all the disks by the file system (e.g., the containerized system of FIG. 1). The sum of the size of all SSDs may map to the size of the logical volume.

Figure 2:
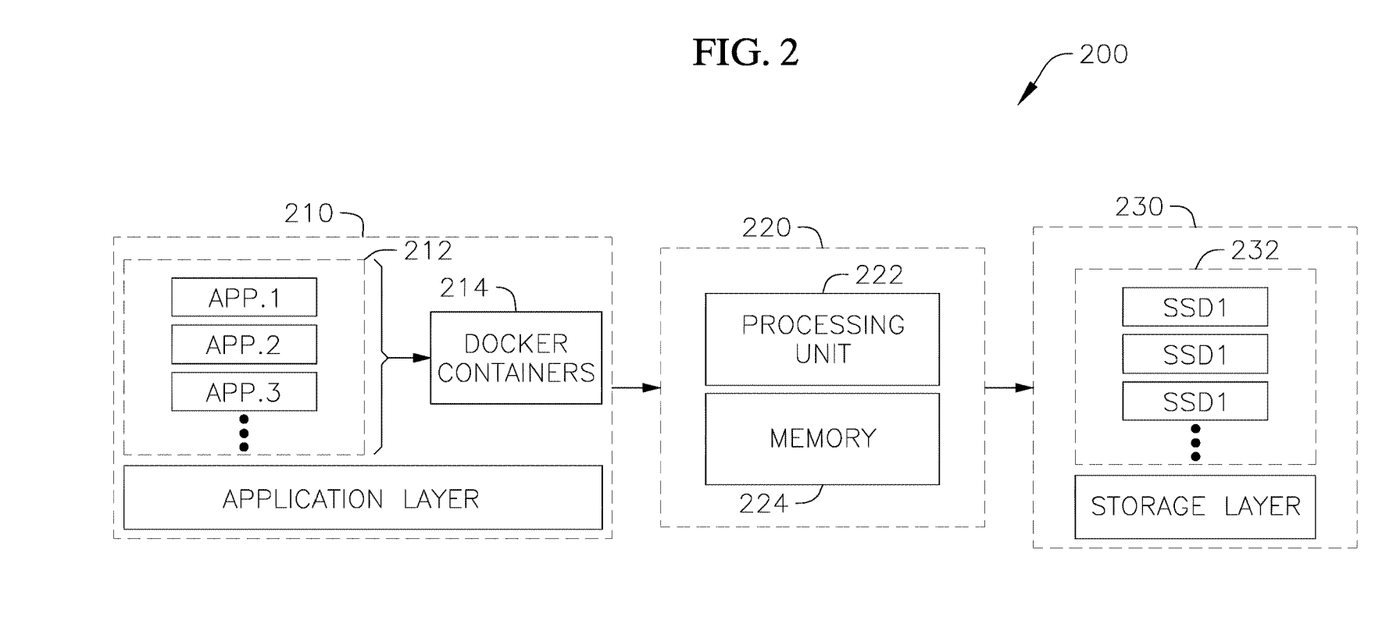
FIG. 2 is a schematic diagram illustrating a system stack, which may be applied to one or more example embodiments according to the present invention.

FIG. 2 is a schematic diagram illustrating a system stack 200 of a platform, which may be applied to one or more example embodiments according to the present invention. The system stack 200 according to example embodiments includes an application layer 210, a processing layer 220 and a storage layer 230. For example, according to some example embodiments, the storage layer 230 of FIG. 2 may correspond to the SSDs 118 of FIG. 1, the application layer 210 of FIG. 2 may correspond to the containers 112 of FIG. 1, and the processing layer (or the processing system) 220 may represent a processing system that is shared between the first and second systems 110 and 120.

The application layer 210 includes a number of applications (e.g., App. 1, App. 2, App. 3, etc.) 212 that run in docker containers 214. The applications 212 utilize a processing unit 222 (or a processor) of the processing layer 220. All of the docker containers 214 utilize and compete for the processing unit 222. The processing layer 220 also includes a memory 224, which may include memory and page cache that may be shared by all three of the application layer 210, the processing layer 220 and the storage layer 230. In other embodiments, the storage layer 230 may have its own memory. According to one or more example embodiments, no prior resource allocation in terms of processing unit 222 and the memory 224 are done and all the containers 214 compete on these shared resources at run time.

The storage layer 230 includes SSDs (e.g., SSD1, SSD2, SSD3, etc.). While not shown in FIG. 2, the storage layer 230 may also include an HDD or another SSD (e.g., see the disk 130 of FIG. 1). Hence, the storage layer according to one or more example embodiments is managed in two different stacks: the HDD (or another SSD); and an array of multiple (e.g., 3) SSDs 232. The HDD (or another SSD) stores the operating system (OS) (e.g., the host OS of FIG. 1), the docker engine (e.g., the docker engine 126 of FIG. 1), container images (e.g., the application images 122 of FIG. 1), and/or the like. The array of multiple SSDs 232 are dedicated to store database of all containerized applications managed by LVM (e.g., as mapped into the logical volume 114 of FIG. 1).

The systems illustrated in FIGS. 1 and 2, for example, may have been configured with one or more of the software, hardware and/or firmware specified in below Table I to perform docker performance analysis to produce results that are utilized to implement one or more embodiments according to the present invention. Example embodiments according to the present invention may be implemented with one or more of the same software, hardware and/or firmware, but the present invention is not limited to any specific software, hardware and/or firmware.

TABLE I

| System Configuration | |
|---|---|
| CPU Type | Intel(R) Xeon(R) CPU ES-2640 v3 |
| CPU speed | 2.60 GHz |
| CPU #cores | 32 hyper-threaded |
| CPU cache size | 20480 KB |
| CPU Memory | 120 GB |
| OS Type | Linux |
| Kernel Version | 4.2.0- 37- generic |
| Operating System | Ubuntu 16.04 LTS |
| SSD capacity | 960 GB |
| Docket version | 1.11 |
| MySQL version | 5.7 |
| Cassandra version | 3.0 |
| FIO version | 2.2 |

As shown in Table I, MySQL and Cassandra were selected for the docker performance analysis as these two are not only popular in relational database or NoSQL database applications, but they are also widely adopted by companies using docker for production. Respectively, TPC-C benchmark in MySQL container and Cassandras built-in benchmark tool Cassandra-stress were run for the performance analysis.

As can be seen in the system stack of FIG. 2, the application layer 210 includes multiple concurrently (e.g., simultaneously) operating containers. Each container works in its own separate workspace in terms of file system and database. The performance of two database applications (MySQL 5.7 and Cassandra 3.0) was analyzed for an increasing number of docker containers. Here, two different scenarios of homogeneous and heterogeneous container traffic were analyzed. The homogeneous container traffic was caused by containers running a same application under same workload resources (e.g. client threads, data set size, read/write ratio, etc.). The heterogeneous container traffic was caused by containers running different workloads and different applications.

The processing layer included a single processing unit for which all the docker containers competed. Memory and page cache were a shared resource between all containers. No prior resource allocation in terms of processing unit and memory were done and all the containers competed on these shared resources at run-time. The storage layer was managed in two different stacks: a hard drive that was responsible for storing OS, docker engine, container images, etc.; and an array of three (3) SSD drives dedicated to store the database of all containerized applications managed by the LVM.

Two different types of containerized setup, i.e., homogeneous and heterogeneous, were used, and FIO benchmark was used to cross verify the observations obtained from I/O intensive applications MySQL and Cassandra. An increasing number of concurrently (e.g., simultaneously) operating containerized instances were used. Using the above system, a performance of containerized docker applications on NVMe high performance SSDs was evaluated. Herein, NVMe SSDs may be referred to as a disk.

The container instances of the same application with the same workload characteristics are called homogeneous. For example, the setup is called homogeneous if all containers are of MySQL running with same workload. Homogeneous docker containers were explored by using MySQL and Cassandra applications. Then one of the interesting observations was cross verified by a similar FIO benchmark workload setup.

It was found that containerized instances of MySQL scale well with increasing number of containers. In spite of decrease in throughput of individual containerized instances, the combined throughput increased with an increasing number of containers. With increasing numbers of instances, CPU utilization increased and disk utilization initially increased until it became saturated. After disk utilization became saturated, IO wait increased.

Containerized instances of Cassandra each with Cassandra-stress random write workload running with 50,000,000 records and 1 KB column size were also analyzed. Here, the containerized instances of Cassandra random write were scaled with increasing number of containers up to six (6) concurrent (e.g., simultaneous) containers. Then, it was observed that the throughput saturated for further increase in the number of containers. Even with maximum instances, the disk utilization was not yet saturated, and kept IO wait very low.

Containerized instances of Cassandra each with Cassandra-stress random read workload running with 50,000,000 records and 1 KB column size were also analyzed. An exceptionally high performance was observed until the number of containerized instances were increased up to three (3) because most of the reads were happening from memory and page cache. The combined size of four (4) or more containers was not sufficient to fit in memory. Thus increases in the number of disk operations dropped the throughput, limited by disk bandwidth. For example, the maximum CPU utilization was 65%. It is shown that, initially for a small number of concurrent (e.g., simultaneous) containerized instances, as most of the operation was performed from memory, disk utilization was very low. But then when the throughput drop valley was observed, most of the operations were performed from disk, leading to increase and saturation of disk utilization and increased IO wait.

In order to cross verify the above observed anomalous phenomenon of throughput valley, a similar FIO benchmark setup experiment was performed. The size of each containerized FIO instance was set similar to the size of Cassandra container running Cassandra-stress random read workload. For the FIO experiment setup, page cache was not bypassed, in order to observe effect of operations from memory.

The result of containerized instances of FIO benchmark each with 4K random read workload running with job size 32 and IO depth 32 was analyzed. A throughput valley similar to the throughput valley as observed in the above containerized instances of Cassandra was observed. And similar trends as in the Cassandra case show the aggregated bandwidth of read operations from application side. The higher bandwidth for a small number of concurrent (e.g., simultaneous) containerized instances was in the proximity of memory bandwidth. The saturated bandwidth observed for 6, 7 and 8 concurrent (e.g., simultaneous) instances fell in proximity to the maximum available disk bandwidth. Thus, the above observations cross verified the throughput valley effect. This depicts that the information about size of each container is very important. When the size of a container is small such that majority of its operations can be performed from page cache and memory, after memory reaches its saturation, any further increase in the number of containers may lead to exponential increase in the number of disk operations, which in turn may lead to drastic throughput drop.

Thus, if an application is performing more writes, then one can increase a number of homogeneous containers to increase throughput until resources like CPU and disk become saturated. If the application is more read intensive and the container size is small such that the majority of its operations can be performed from page cache and memory, then it is generally desirable to limit the number of containers before falling into throughput valley.

The container instances of either different application or different workload characteristics may be referred to as heterogeneous. For example, the setup is called heterogeneous if containers of MySQL and Cassandra are operated concurrently (e.g., simultaneously). Heterogeneous docker containers were explored by using MySQL and Cassandra applications. Also, different type of heterogeneous mix were explored, including 1) a combination of different application instances with sequential and random writes; 2) a combination of different application instances with similar types of writes (e.g., applicationl performing random writes with application 2 also performing random writes); and 3) a combination of write intensive and read intensive containerized instances.

Containerized instances of Cassandra and MySQL were concurrently (e.g., simultaneously) operated. Each Cassandra instance had Cassandra-stress random write workload running with 50,000,000 records and 1 KB column size, and each MySQL instance had TPC-C workload running with 1,250 warehouses and 100 connections. It was observed that, in comparison to the homogeneous system, the average throughput degradation of Cassandra containers was around 16%, while throughput degradation of MySQL containers was around 50%. Thus, MySQL containers scarified more than Cassandra containers.

It was predicted that the reason behind the unfair throughput throttle observed in the above heterogeneous system was that Cassandra performs higher amount of large sequential writes in comparison to MySQL. In order to validate this prediction, the same configuration of Cassandra containers was experimented with FIO random writes and FIO sequential writes. A similar unfair throughput throttle was realized. The saturated throughput with homogeneous FIO random write instances was 250,000 Iops, but the maximum throughput observed in the heterogeneous system was 134,000 Iops. Thus, it was verified that if containers of an application having higher proportion of sequential writes is operated concurrently (e.g., simultaneously) with containers of an application performing random writes, then the throughput of the application performing random writes is unduly sacrificed.

In order to cross verify the above validation, a concurrent (e.g., simultaneous) operation of the same configuration of Cassandra containers with FIO sequential write was performed. Here, Cassandra was concurrently (e.g., simultaneously) operated with FIO sequential writes. Each Cassandra instance had Cassandra-stress random write workload running with 50,000,000 records and 1 KB column size, and each FIO container operated with 128K sequential write workload running with job size 32 and IO depth 32. The saturated throughput with homogeneous FIO sequential write instances with same configuration is 6,500 Iops. It was observed that the throughput of both applications individually degraded only by 10% to 15%.

Finally, in order to show behavior of concurrently (e.g., simultaneously) operating write intensive and read intensive application containers, the results of Cassandra operating with FIO random read was analyzed. Each Cassandra instance had Cassandra-stress random write workload running with 50,000,000 records and 1 KB column size, and each FIO container operated with 4K random read workload running with job size 32 and IO depth 32. The saturated throughput with homogeneous FIO random read instances with same configuration is 450,000 Iops. It was observed that the throughput of both applications individually degraded only by 10% to 15%.

The effect of increasing the number of concurrently (e.g., simultaneously) operating docker containers, supported by docker data volume on a stripped logical volume of multiple SSDs was investigated. The throughput of applications in homogeneous and heterogeneous environment was analyzed, and the observation was cross-verified by experiments on similar FIO benchmark workload setup.

For homogeneous containers, in particular the behavior of write intensive and read intensive, homogeneous grouping of containers, was analyzed. It was observed that, if application is performing more writes then increasing number of homogeneous containers increases throughput until resources like CPU and disk become saturated. If the application is more read intensive and the container size is small such that majority of its operations can be performed from page cache and memory, then it is generally desirable to limit the number of containers before falling into throughput valley.

It was concluded that smart heterogeneous mix of the containers of different applications generally led to better utilization of overall throughput. It is generally not desirable to mix containers of applications performing sequential writes and random writes, because for such a mix the throughput distribution was unfair. In such a mix, the throughput of application performing random writes degraded more than 50%. Combination of the containers of applications performing similar operations (e.g. both performing majority of sequential writes), led to fair throughput throttles between application containers. Lastly, combining containers of write intensive and read intensive application increased the scope of resource utilization with fair throughput degradation. In spite of operating double the number of simultaneous containers, the united throughput of each application degraded only around 10% when compared to the standalone implementation of respective applications.

Utilizing the results of the analyses of the above described homogeneous and heterogeneous systems, a controller (an intelligent controller) according to example embodiments of the present invention utilizes workload characteristics/properties including, but not limited to, random writing, sequential writing, read intensive and write intensive, to make the determination on the distribution of the buckets (or containers or workloads contained therein) to one or more of the storage devices that may be of one type or a mixed type including different types of storage devices.

Figure 3:
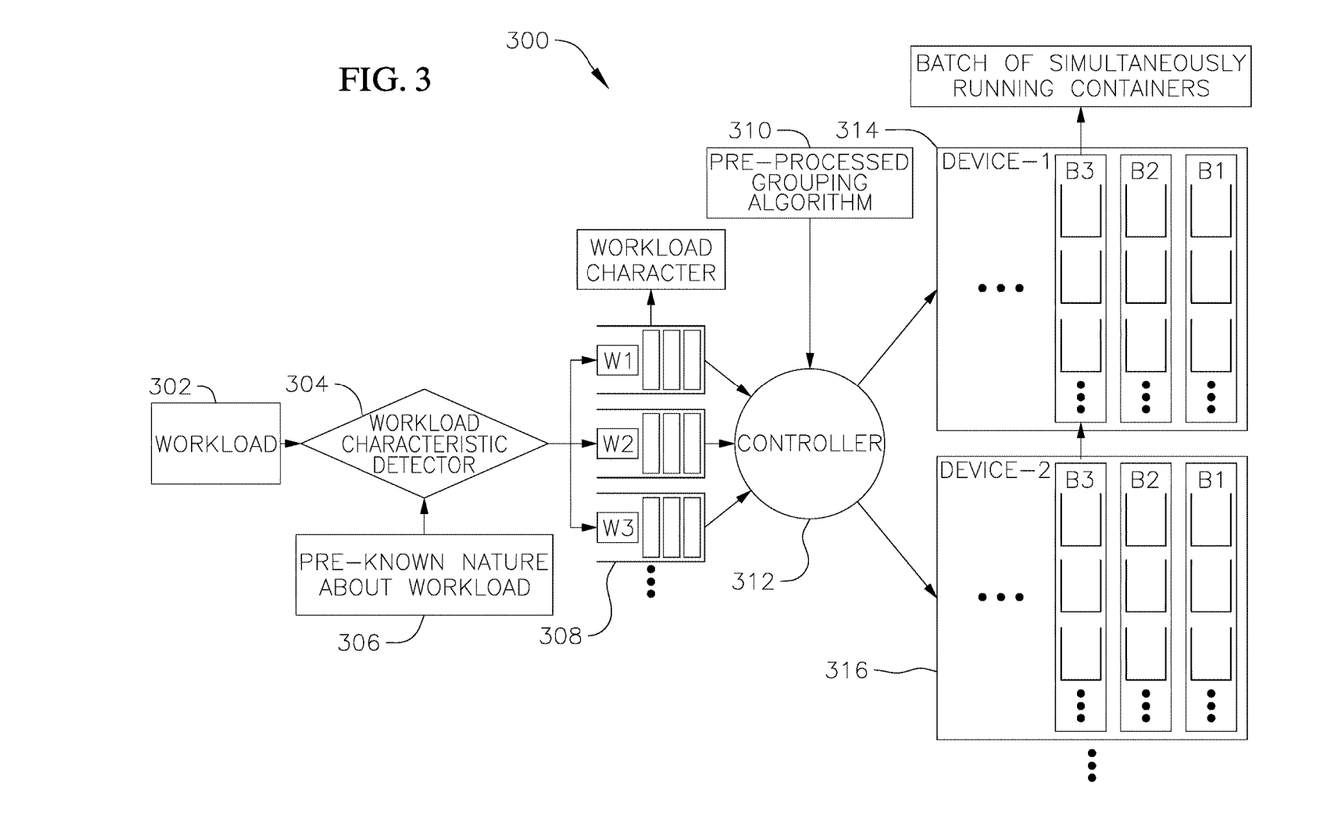
FIG. 3 is a schematic diagram illustrating a system architecture including a controller (e.g., an intelligent controller) according to one or more example embodiments of the present invention.

FIG. 3 is a schematic diagram illustrating a system architecture 300 including a controller (e.g., an intelligent controller) 312 according to one or more example embodiments of the present invention. The controller 312 may be an intelligent controller that is used in a containerized environment. From a storage point of view, the controller 312 according to example embodiments automatically detects different types of workloads, characterizes them, and distributes the workloads to different storage devices. The controller 312 may be utilized in a containerized environment where a number of concurrently (or simultaneously) operating containers keep increasing to maintain or guarantee application level performance, such as, for example, Quality of Service (QoS).

Different container instances may have quite different characteristics of their workloads. The characteristics of the workloads may include, but are not limited to sequentiality, activeness, read/write intensive, and/or the like. The controller 312 can work with a wide range of different workloads.

The controller 312 according to example embodiments of the present invention may work with all suitable storage types known to those with ordinary skill in the art. For example, the controller 312 may work with SSDs, HDDs, and with network/cloud and/or directly attached storage devices, and any suitable combination (e.g., a mixed or hybrid configuration) of these storage devices. As long as the controller 312 is aware of the characteristics of the storage system, it can leverage this and distribute the performance in the most efficient way.

As illustrated in FIG. 3, the system 300 includes a workload characteristic detector 304 for determine characteristics of workloads. A workload or workloads (e.g., new workload or workloads or application(s) having the associated workload(s)) 302 are provided to the workload characteristic detector (or a detector) 304. The workload characteristic detector 304 may be utilized to detect workload characteristic during real time (e.g., run-time) whenever new workload 302 comes in, and/or may be provided with some pre-known nature about the workload. For example, the pre-known nature may include, but is not limited to, that MySQL is generally more random workload, or that Cassandra is generally more sequential workload. Further, the workload characteristic (and/or the detection scheme) may be static or more dynamic.

As such, the workload characteristic detector 304 may also receive information 306 on the pre-known nature (or pre-known characteristics) about the workload or workloads. Utilizing the information 306 and/or any ongoing observed characteristics, the workload characteristic detector 304 assigns the container of the workload one or more labels or characteristics, illustrated by the workload "buckets" 308, each of which has an associated (or existing) workload character/property W1, W2 or W3. To this end, after workloads (and/or the characteristics) are detected, the workload's container may be grouped based on different characteristics into the workload buckets 308 (W1-W3). Here, each group may have similar types of properties. For example, one group may include all sequential workloads, one group may include all the writes, and another group may include all the reads. The workloads are divided to descriptive buckets (or containers), and the number of the descriptive buckets may be variable, and should be separated from each other based on their respective characteristics.

The system may include any suitable number of buckets, which may be variable. The buckets 308 should not be understood as queues, but are rather conception labels (or labelings) based on workload characteristics. Once a container is characterized, it is assigned to a device by the controller 312, and it runs on that device normally. Also, there may not be a one-to-one mapping between the buckets 308 and the devices 314, such that any suitable number of the buckets may be mapped to any suitable number of the devices 314, and multiple buckets may be assigned to one device, if the workloads they represent are compatible. Here, the controller 312 understands the workload characteristics and which workloads would have a conflict with each other and may assign (e.g., intelligently assign) the buckets (or containers) to a device or devices that do not have conflicting workload types. For example, random writes and sequential writes may be conflicting workload types that should be assigned (or distributed) to different device resources 314, 316 according to example embodiments. Also, the maximum write bandwidth should match that of the device. Conflicts may arise from garbage collection or from performing massive writes on the same channel to be read from. The controller 312 understands these conflicts, and balances a proper mix of reads, writes, and/or sequentiality of reads and/or writes to each drive. Of course, the number of buckets and the mapping to the devices 314 may be limited by the system resources as those skilled in the art would appreciate.

The workload characteristic detector 304 according to example embodiments may take pre-known nature 306 of some applications/workloads and/or perform run-time workload characterization. The pre-known nature about workload may be partial, and the workload characteristic detector 304 can learn and adjust its workload characterizations by tracking the behaviors of various applications on containers. The workload characteristic detector 304 according to example embodiments may differentiate (or is utilized or configured to differentiate) types of workload from various containerized applications (e.g., upper containerized applications) (e.g., sequentially, read/write ratio, target throughput, time to live (TTL), etc.).

While the workload characteristic detector 304 is illustrated as being located external to the controller (e.g., the intelligent controller) 312 in FIG. 3, the detector 304 may actually be implemented in (or integrated with) the controller 312 according to one or more example embodiments. The controller 312 receives a pre-processed grouping algorithm 310 (which may be based off of the results presented above), and may use the algorithm 310 to group the buckets 308 into different devices (e.g., Device-1, Device-2, etc.) 316 as respective batches of concurrently (e.g., simultaneously) running containers (e.g., B1, B2, B3, etc.).

For example, the devices 316 may have the same or similar architecture as the array of SSDs 118 or FIG. 1 and/or the storage layer 230 of FIG. 2. Hence, the controller 312 may be applied to the system 100 illustrated in FIG. 1 to distribute the workloads amongst the containers 112 and/or the docker containers 214 according to one or more example embodiments of the present invention.

The electronic or electric devices and/or any other relevant devices or components according to example embodiments of the present invention shown and/or described herein, such as, for example, the docker engine 126, the processing unit 222, the memory 224, the workload characteristic detector 304, the controller 312, or any other processors, memory, devices or units, and any and all components included therein, may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, HDD, SDD, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

Returning now to FIG. 3, the buckets 308 (or the application containers 112 of FIG. 1 or the docker containers 214 of FIG. 2) may allow for the implementation of a containerized platform that provides lightweight virtualization, multi-tenancy and better development productivity. The lightweight characteristics of containers may promote the concurrent (e.g., simultaneous) use of multiple containers to deploy multiple instances of same or different applications. Increase in the number of concurrently (e.g., simultaneously) operating containers may not guarantee an aggregated performance improvement due to saturation. Thus, according to example embodiments of the present invention, application level fairness and/or quality of service (QoS) may be maintained for each individual container through better or improved resource management.

For example, workloads or activeness for applications running in each of the multiple containers could be quite different (e.g., write intensive vs. read intensive; sequential vs. random; active vs. idle; etc.) and all of these containers running on the same host may have different resource requirements or utilization. To better utilize the available storage resources in a containerized environment, the controller (e.g., the intelligent controller) 312 is provided in one or more example embodiments manages different types of containers to achieve better or improved performance through improved or optimal storage device utilization.

Therefore, the controller 312 according to one or more example embodiments of the present invention is suitable for container environment, such as docker, and leverages (or is configured to leverage) multiple concurrent (e.g., simultaneous) applications while maintaining application level fairness, QoS, resource utilization, and/or the like. Because the controller 312 considers the storage resource, and not memory or CPU, the workload characteristic may be captured somewhere close to the real I/O layer, for example, the block layer.

The controller 312 according to one or more example embodiments of the present invention has one or more of the following, but is not limited to, features: 1) Grouping (or is configured to group), utilizing a result of a performance study, different containerized applications such that they operate concurrently (or simultaneously) for better resource utilization and with fair throughput distribution (using grouping methods described below); 2) Balancing (or is configured to balance) the storage resource requirements for all containerized applications to ensure fair resource management (using the above balancing method and grouping methods described below); and 3) distributing (or is configured to distribute) containerized workloads to different storage devices.

For example, the controller 312 may have some grouping algorithms (e.g., pre-defined grouping algorithms 310), such that when the workloads are fed into the controller, the controller can improve or optimize device performance. For example, the controller 312 may direct (distribute or send) all sequential request so the same device or a same set of devices; and/or direct (distribute or send) a mix of read and writes to the same device or a same set of devices; and/or mix two or more buckets of workloads into the same device or a same set of devices.

Further, the controller 312 according to one or more example embodiments of the present invention uses one or more of the following, but is not limited to, balancing methods: 1) grouping (or is configured to group) all sequential access to one device (or a same group of devices); 2) grouping (or is configured to group) write-intensive and read-intensive containers to one device (or a same group of devices), which may yield the maximum number of devices operating concurrently on a set of resources; 3) grouping (or is configured to group) active and idle containers to one device (or a same group of devices), which may take their idle and active schedules into account in such placement, which may allow for combining the maximal amount of containers with a minimal amount of resource utilization; and 4) grouping (or is configured to group) containers of similar time to live (TTL) to the same device (or a same group of devices). Those skilled in the art would realize that other groupings may be possible after studying the disclosures regarding embodiments of the present invention described herein. For example, random-access applications may be grouped and segregated to different devices.

According to one or more example embodiments of the present invention, the controller 312 applied to containerized applications has one or more of the following features: 1) increase in QoS in terms of application throughput and latency; 2) better storage device utilization with good distribution of application containers; 3) balance the storage resource requirement for all containerized applications to ensure fair resource management; and 4) leverage the lifetime of SSDs as main storage by grouping containers and/or data blocks of similar TTL to the same device.

Figure 4:
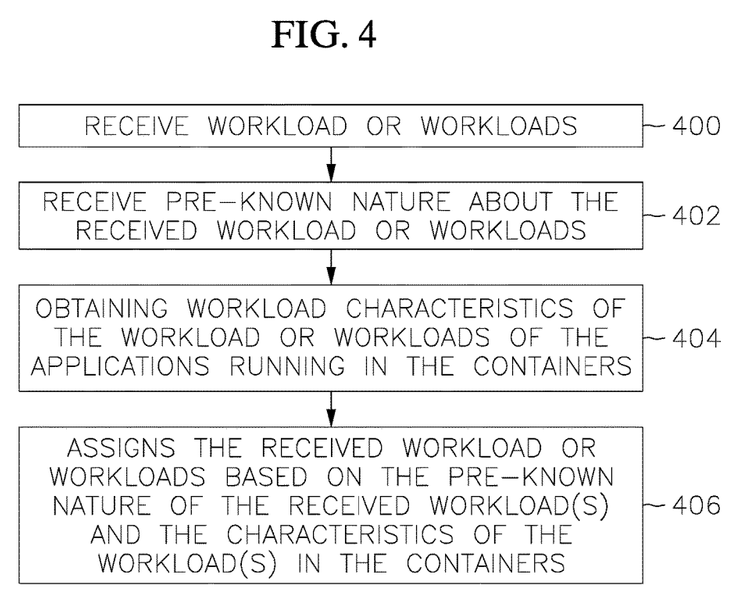
FIG. 4 is a flow diagram illustrating workload assignment by the workload characteristic detector of FIG. 3 according to one or more example embodiments of the present invention.

FIG. 4 is a flow diagram illustrating workload assignment by the workload characteristic detector (or the detector) 304 of FIG. 3 according to one or more example embodiments of the present invention. The workload characteristic detector 304 may be implemented in or integrated with the controller 312, or may be implemented separately from and/or external to the controller 312.

As can be seen in FIG. 4, the workload characteristic detector 304 receives workload or workloads (or receives information regarding the workload or workloads) (400) and the pre-known nature of the received workload or workloads (402). The workload characteristic detector 304 also obtains workload characteristics of the workload or workloads associated with the applications running in the buckets 308 (404). Based on the pre-known nature of the received workload or workloads and the characteristics of the workload or workloads in the buckets 308, the workload characteristic detector 304 assigns the received workload or workloads to the buckets 308.

Figure 5:
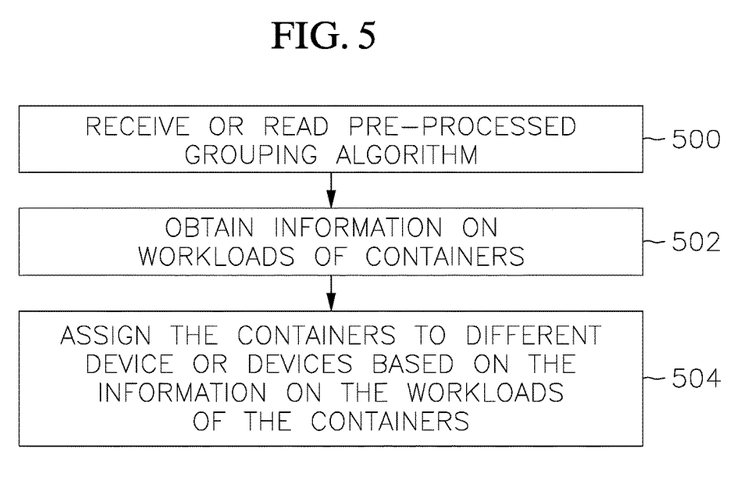
FIG. 5 is a flow diagram illustrating balancing/grouping by the controller of FIG. 3 according to one or more example embodiments of the present invention.

FIG. 5 is a flow diagram illustrating balancing/grouping by the controller 312 of FIG. 3 according to one or more example embodiments of the present invention.

As can be seen in FIG. 5, the controller 312 receives or reads the pre-processed grouping algorithm 310 (500). The pre-processed grouping algorithm 310 may be pre-programmed or stored in the controller 312, and/or may be readily accessible by the controller 312. The controller 312 also obtains container workloads grouped on the basis of workload character/property of the buckets 308 (502). Utilizing the information regarding the workload/workloads character/property (e.g., W1, W2, W3, etc.) of the buckets 308, the controller 312 assigns the buckets 308 to the device or devices (e.g., Device-1, Device-2, etc.) 314 and/or to one or more of the batch of concurrently (e.g., simultaneously) running containers (504). The devices 314 in example embodiments may be storage devices, such as, for example, solid state drives (SSDs), hard disk drives (HDD), and/or any suitable storage devices known to those skilled in the art.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents. Further, those skilled in the art would appreciate that one or more features according to one more embodiments of the present invention may be combined with one or more other features according to one or more other embodiments of the present invention without departing from the spirit and scope of the present invention.

What is claimed is:

1. A system comprising:
a plurality of storage devices configured to store data associated with at least one of homogeneous and heterogeneous applications running in containers; and
a physical component comprising a programmed controller configured to balance workloads of the containers by:
grouping the containers based on characteristics of the workloads of the containers, and
grouping active and idle containers to one of the storage devices based on time to live (TTL) of the active and the idle containers.

2. The system of claim 1, further comprising a physical component comprising a programmed detector configured to detect characteristics of a new workload to be assigned to the containers.

3. The system of claim 2, wherein the physical component comprising the programmed detector is further configured to obtain characteristics of an existing workload running in the containers.

4. The system of claim 3, wherein the physical component comprising the programmed detector is further configured to assign the new workload to the containers based on the characteristics of the new workload and the existing workload.

5. The system of claim 2, wherein the physical component comprising the programmed detector is integrated with the physical component comprising the programmed controller.

6. The system of claim 2, wherein the physical component comprising the programmed controller is further configured to obtain information regarding the assignment of the new workload from the physical component comprising the programmed detector.

7. The system of claim 1, wherein the physical component comprising the programmed controller is configured to balance the workloads by distributing the containers to one or more of the storage devices.

8. The system of claim 1, wherein the physical component comprising the programmed controller is configured to balance the workloads to improve quality of service (QoS) in terms of application throughput and latency.

9. The system of claim 1, wherein the physical component comprising the programmed controller is configured to balance the workloads to improve distribution of the containers, thereby improving utilization of the storage devices.

10. The system of claim 1, wherein the physical component comprising the programmed controller is further configured to balance storage resource requirements for all containerized applications to ensure fair resource management.

11. The system of claim 1, wherein the physical component comprising the programmed controller is configured to balance the workloads by grouping all sequential accesses to one of the storage devices or a group of the storage devices.

12. The system of claim 1, wherein the physical component comprising the programmed controller is configured to balance the workloads by grouping write-intensive and read-intensive containers to one of the storage devices or a group of the storage devices.

13. The system of claim 1, wherein the physical component comprising the programmed controller is configured to balance the workloads by grouping the containers of same TTL (time to live) to a first storage device of the plurality of storage devices, the first storage device comprising at least two storage devices of the plurality of storage devices.

14. A method of balancing workloads in containers, the method comprising:
    receiving a new workload;
    receiving or detecting characteristics of the new workload;
    obtaining characteristics of existing workloads in the containers;
    assigning the new workload to the containers based on the characteristics of the new workload and the characteristics of the existing workloads; and
    balancing the new workload and the existing workloads by grouping active and idle containers to a storage device based on time to live (TTL) of the active and the idle containers.

15. The method of claim 14, the method further comprising:
    reading a grouping algorithm;
    obtaining information on the new workload and the existing workloads of the containers; and
    assigning the containers to different device or devices based on the information on the new workload and the existing workloads of the containers.

16. The method of claim 15, wherein the new workload and the existing workloads are balanced by grouping all sequential accesses to a storage device or a group of storage devices.

17. The method of claim 15, wherein the new workload and the existing workloads are balanced by grouping write-intensive and read-intensive containers to a storage device or a group of storage devices.

18. The method of claim 15, wherein the new workload and the existing workloads are balanced by grouping the containers of same TTL (time to live) to a storage device.

19. A controller system comprising:
    a processor, and
    a memory device, wherein the memory device stores computer executable instructions that, when executed by the processor, cause the processor to balance workload of containerized applications by assigning containers to different device or devices based on information on workloads of the containers and by grouping active and idle containers to one of the devices based on time to live (TTL) of the active and the idle containers.

* * * * *